Figure 4:
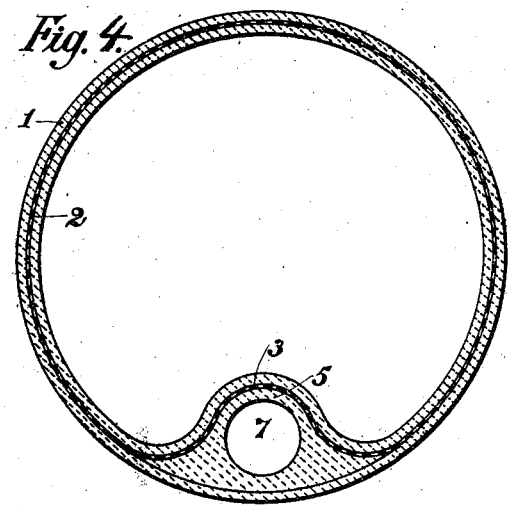

F. H. HALL.
REINFORCED INNER TUBE FOR PNEUMATIC TIRES.
APPLICATION FILED SEPT. 9, 1910.
1,014,464.
Patented Jan. 9, 1912.
2 SHEETS—SHEET 1.
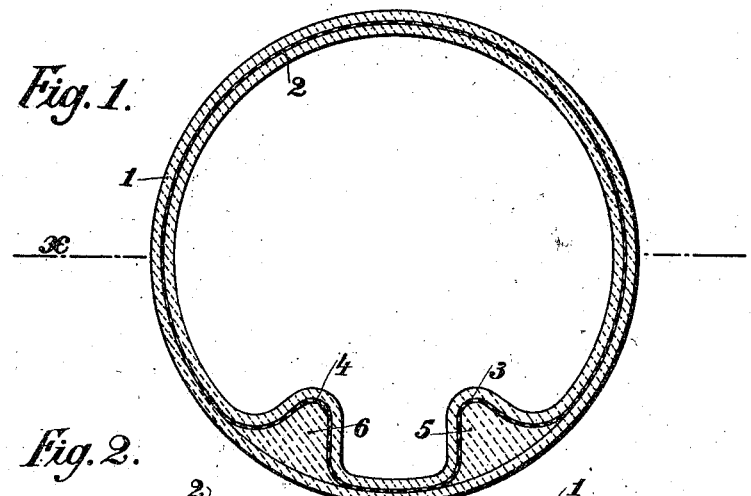
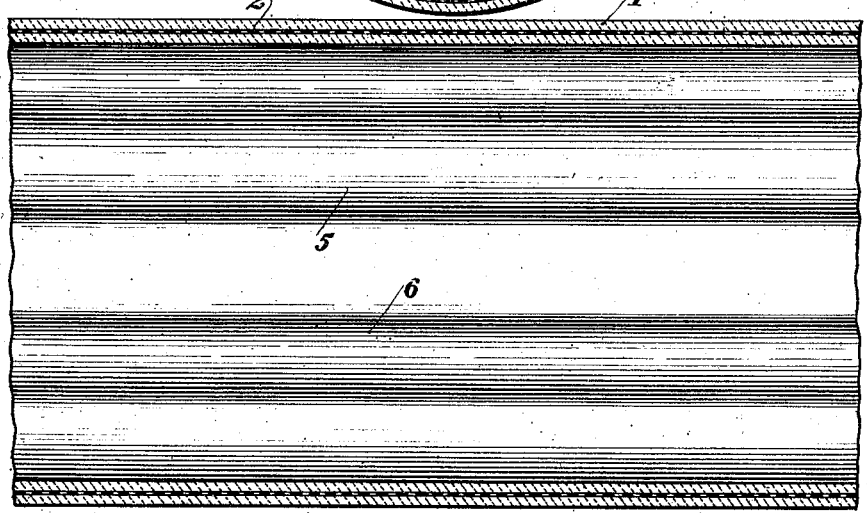
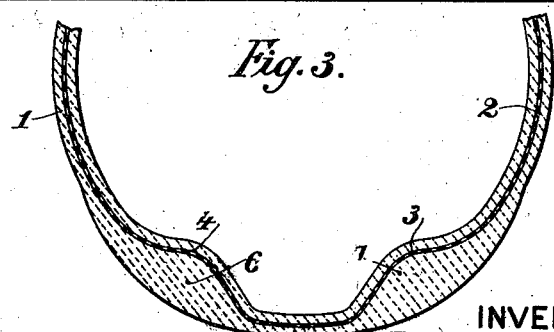
WITNESSES
INVENTOR
Frederick H. Hall F. H. HALL.
REINFORCED INNER TUBE FOR PNEUMATIC TIRES.
APPLICATION FILED SEPT. 9, 1910.

1,014,464.

Patented Jan. 9, 1912.

2 SHEETS—SHEET 2.

WITNESSES

INVENTOR
Frederick H. Hall

UNITED STATES PATENT OFFICE.

FREDERICK HAROLD HALL, OF NORTON LINDSEY, ENGLAND.

REINFORCED INNER TUBE FOR PNEUMATIC TIRES.

1,014,464.  Specification of Letters Patent.  Patented Jan. 9, 1912.

Application filed September 9, 1910. Serial No. 581,244.

*To all whom it may concern:*

Be it known that I, FREDERICK HAROLD HALL, a subject of the King of Great Britain, residing at Gannaway Gate, Norton Lindsey, Warwickshire, England, have invented certain new and useful Improvements in Reinforced Inner Tubes for Pneumatic Tires, of which the following is a specification.

This invention relates to reinforced inner tubes for pneumatic tires in which one or more layers of strong fabric or canvas are embedded in or combined with the rubber of the tube so as to enhance the strength of the latter and acts as a support for the walls thereof, thus preventing bursting or undue expansion in the event of the outer cover being cut or otherwise damaged.

The invention relates more particularly to reinforced tubes of the type wherein the walls include or are combined with a continuous or endless band or layer of fabric which completely encircles the tube and is adapted to expand therewith up to a certain limit so as to then act as a check to prevent over-distention.

The primary object of the present invention is to provide an improved and more efficient form of tube of the type mentioned which enables it to be manufactured readily and economically.

Figure 1 of the accompanying drawings represents a cross-section of a reinforced inner tube made in accordance with one form of this invention. Fig. 2 is a longitudinal horizontal section on line $x$ Fig. 1. Fig. 3 shows the said tube when partially distended, and Fig. 4 represents a transverse section of a modified form of tube having a single hollow ridge.

The same letters of reference indicate corresponding parts in each of the figures of the drawings.

Referring to Figs. 1 to 4, the tube 1 is of circular section externally, and is reinforced by a band of canvas or other suitable fabric 2. This reinforcing band, which may be in one or more layers, and either woven endless or overlapped is embedded within the rubber of the walls as shown, and passes right around the tube so as to completely encircle it, leaving no part unprotected. To allow of expansion of the tube the said band 2 is made of greater transverse circumferential length than that of the center line of the walls of the deflated tube, and near the inner circumference, the excess length of the band is plaited or folded longitudinally at two points 3, 4, so as to form a pair of deep inwardly-extending open plaits or gussets. These plaits are embedded within, or filled up or surrounded by, longitudinally thickened parts or ridges, 5, 6, of rubber; or they may be left hollow so as to reduce the cost of manufacture. When now the tube is inflated the rubber walls expand, and the plaited parts, 3, 4, of the band 2 extend or unfold or pay themselves out, with the said walls, as shown in Fig. 3, until the band attains the shape of a complete circle, which is the limit of expansion, when it acts as a positive check for preventing over distention of the tube. While this expansion is taking place the ridges 5, 6, also extend transversely and assume a flattened form. The tube is preferably made from two sheets of rubber, one applied to the outside of the canvas and the other to the inside (or the canvas applied to the outside of this inner sheet) the plaits or folds of said canvas being subsequently filled in with rubber to form the solid ridges, 5, 6.

Instead of the canvas 2 being plaited at two points as described, only a single plait 3 may be employed, as shown in Fig. 4, this plait being arranged centrally around the inner circumference, or at any other suitable point. It is embedded in the single central ridge 5, which, to allow of expansion with a comparatively low air pressure, is made hollow or provided with a circumferential hole 7 so reducing the effective thickness. This form of tube is particularly applicable for use with motor cycles.

Having fully described my invention what I desire to claim and secure by Letters Patent is:—

1. A reinforced inner tube for pneumatic tires the walls of which are combined with a continuous encircling band of fabric which is plaited circumferentially, said plait of the fabric contained within and filled by a thickened ridge of rubber which conforms to the shape of the plait.

2. A reinforced inner tube for pneumatic tires having a wall and a continuous encircling band of fabric embedded in said wall and plaited circumferentially, the portion of the wall inclosing the plaited portion of the fabric being ribbed internally to conform to such plaited portion of the fabric.

3. A reinforced inner tube for pneumatic tires having a wall and a continuous band of fabric embedded in said wall, such fabric being plaited circumferentially and the wall of the tube having a ridge which incloses and conforms to the shape of the plait of the fabric, such plait and ridge projecting into the interior of the tube while the latter is deflated and projecting to the exterior of the tube when the latter is inflated.

In testimony whereof I have hereunto set my hand in presence of two subscribing witnesses.

FREDERICK HAROLD HALL.

Witnesses:
 Hy. Skerrett,
 Henry Norton Skerrett.